(12) United States Patent
Singh et al.

(10) Patent No.: US 11,073,965 B2
(45) Date of Patent: Jul. 27, 2021

(54) GRAPHICAL INTERFACE FOR PRESENTATION OF INTERACTION DATA ACROSS MULTIPLE WEBPAGE CONFIGURATIONS

(71) Applicant: Adobe Inc., San Jose, CA (US)

(72) Inventors: Harpreet Singh, San Jose, CA (US);
Balaji Krishnamurthy, Noida (IN);
Akash Rupela, Delhi (IN)

(73) Assignee: ADOBE INC., San Jose, CA (US)

( * ) Notice: Subject to any disclaimer, the term of this patent is extended or adjusted under 35 U.S.C. 154(b) by 81 days.

(21) Appl. No.: 16/193,475

(22) Filed: Nov. 16, 2018

(65) Prior Publication Data

US 2020/0159371 A1    May 21, 2020

(51) Int. Cl.
  *G06F 3/0482*    (2013.01)
  *G06F 40/197*    (2020.01)
  *H04L 29/08*    (2006.01)

(52) U.S. Cl.
CPC .......... *G06F 3/0482* (2013.01); *G06F 40/197* (2020.01); *G06F 2203/04803* (2013.01); *H04L 67/02* (2013.01)

(58) Field of Classification Search
CPC ............... G06F 3/0482; G06F 11/3688; G06F 17/2288; H04L 43/50
See application file for complete search history.

(56) References Cited

U.S. PATENT DOCUMENTS

| | | | |
|---|---|---|---|
| 2011/0276889 A1* | 11/2011 | Boshernitzan | G06F 16/9562 715/738 |
| 2017/0116165 A1* | 4/2017 | Parthiban | H04L 67/02 |
| 2017/0185574 A1* | 6/2017 | Fern | G06F 3/04842 |
| 2019/0089193 A1* | 3/2019 | Ranjan | H02J 13/0003 |
| 2019/0243631 A1* | 8/2019 | Sharma | G06F 21/572 |

* cited by examiner

*Primary Examiner* — Abdullah Al Kawsar
*Assistant Examiner* — David V Luu
(74) *Attorney, Agent, or Firm* — Kilpatrick Townsend & Stockton LLP (57) ABSTRACT

In some embodiments, a configuration management application accesses configuration data for a multi-target website. The configuration management application provides the user interface including a timeline area and a page display area. The timeline area is configured to display timeline entries corresponding to configurations of the multi-target website. Based on a selection of a timeline entry, the page display area is configured to display a webpage configuration corresponding to the selected timeline entry. In addition, the page display area is configured to display graphical annotations indicating interaction metrics for the configured page regions. In some cases, the timeline entries, configurations, and interaction metrics are determined based on a selection of a target segment for the multi-target website.

20 Claims, 5 Drawing Sheets

GRAPHICAL INTERFACE FOR PRESENTATION OF INTERACTION DATA ACROSS MULTIPLE WEBPAGE CONFIGURATIONS

TECHNICAL FIELD

This disclosure relates generally to the field of graphical user interfaces for controlling interactions with computing devices, and more specifically relates to a graphical interface for intuitive development or review of webpage configurations and associated interaction data across multiple versions of a website.

BACKGROUND

A multi-target website includes multiple configurations of the website. The configurations include, for example, variations of webpages that are included in the website. For instance, a website developer or website manager develops the page configurations based on one or more target audiences of the multi-target website. The page configurations include, for example, regions that receive interactions (such as interactions of visitors to the website) or provide data describing such interactions. In some cases, the user develops the page configurations via a user interface, such as a user interface in a website configuration management application. However, a conventional user interface displays a page configuration that is presently available to a visitor (e.g., a "live" webpage), or a page configuration that is presently being edited. The conventional user interface does not display historical configurations of the page. In addition, the conventional user interface does not display interaction data associated with historical configurations of the page.

A user who is attempting to create or evaluate multiple configurations of a multi-target website runs several conventional applications, or a conventional application with several conventional user interface views, to perform actions such as developing the website, viewing interaction data, or selecting a target audience segment for the configurations of the multi-target website. Running several conventional applications may result in inefficient use of computing resources, such as increased expenditure of available display space, computer memory, processing power, or network bandwidth. In addition, a conventional application with several conventional views might allow the user to develop the website in a first view, to review interaction data in a second view, and to select a segment in yet a third view. A user that is using the several conventional applications or conventional views can experience problems related to slow or poor development of the multi-target website. For example, the user experiences frustration or disrupted concentration while switching between the several conventional applications. In some cases, user frustration is particularly prevalent in situations where display space is limited, and the user switches between the conventional applications or conventional views to access the various functions of the conventional applications.

It is beneficial to develop a user interface that is capable of displaying, in a particular view, multiple configurations of a page and historical interaction data associated with the multiple configurations. A user interface that is capable of displaying multiple configurations and the historical data reduces frustration and improve concentration for the user, as well as reducing inefficient use of computing resources.

SUMMARY

According to certain embodiments, a user interface including a timeline area and a page display area is provided, such as by a website configuration management application. The timeline area is configured to display a timeline with multiple timeline entries correlated with respective periods of time. The user interface is configured to receive a selection of a particular one of the timeline entries via the timeline area. In addition, the user interface is configured to update the page display area based on the selection of the particular timeline entry. Updating the page display area includes determining a webpage configuration corresponding to the selected entry. The webpage configuration includes a configured page region that corresponds to an audience segment of the webpage configuration, and is available during the period of time correlated with the selected timeline entry. In addition, metrics corresponding to the selected entry are determined, the metrics representing interaction data for the configured page region during the correlated period of time. Updating the page display area also includes modifying the page display area to present the webpage configuration and a graphical annotation element that indicates the metric. At least a portion of the graphical annotation element overlays the presented webpage configuration.

In some cases, the user interface also includes a segment area configured to display one or more indicators of audience segments. In addition, the user interface is configured to receive a selection of a particular one of the segment indicators. In such cases, the multiple timeline entries are based on the selected segment indicator. For example, a group of webpage configurations associated with the selected segment indicator is determined. In addition, multiple timeline entries that are associated with the group of webpage configurations are determined. The timeline area is updated to present the determined timeline entries associated with the webpage configuration group.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As discussed above, prior techniques for presenting a webpage configuration and interaction data rely on graphical interfaces that include various deficiencies with respect to presenting multiple configurations and associated interactions for a given website. Certain embodiments described herein provide for a website configuration user interface that is capable of presenting a timeline with multiple entries correlated with multiple historical periods of time. The website configuration user interface is also capable of presenting a webpage configuration with graphical annotations of interaction data for the page, based on a selected one of the timeline entries. In some cases, the presented timeline is based on a selected audience segment, such as a timeline with entries correlated with multiple configurations associated with the selected segment. In some embodiments, the selected timeline entry or selected segment are related to a historical multi-target website, and are presented to a user, such as a website developer, who is developing a new multi-target website.

The following examples are provided to introduce certain embodiments of the present disclosure. In some embodiments, a website configuration management application accesses multiple website configurations for a multi-target website. An example of a website configuration is a website, or a webpage, with features or content that are presented to a particular group of website visitors, based on characteristics of the visitors. For instance, a first website configuration presents interactive content customized toward a first type of user device (e.g., smartphones) by which a first group of visitors access the site, and a second website configuration presents interactive content customized toward a second type of user device (e.g., laptops) by which a second group of visitors access the site. In addition, the website configuration management application accesses historical data associated with the multiple website configurations. Each of the website configurations (including configurations of particular pages of the website) is associated with historical update data, such as a timeline of updates implemented on a particular page of the multi-target website. Each particular page configuration is associated with a timeline entry indicating a period of time (e.g., a start date, an end date) when the particular page configuration was available to visitors. In addition, each particular page configuration is associated with historical interaction data, such as data representing visitor interactions with the particular page configuration.

Continuing with this example, the website configuration management application provides a user interface including a timeline area and a page display area. The user interface displays, such as within the timeline area, a timeline including multiple timeline entries. The timeline entries are determined from the historical update data indicating changes to the multi-target website. In some cases, the user interface displays timeline entries indicating change dates for a particular page of the multi-target website. In addition, each of the displayed timeline entries is correlated with a respective period of time. The period of time is based, for example, on the historical update data, such as a period of time between two dates indicating when updates were made to the particular page (e.g., changing from one page configuration to another). In some cases, displaying the timeline in the user interface quickly and efficiently provides a user with information about multiple configurations of the website, such as a quantity of historical configurations for a website, or how frequently the website was updated.

The user interface provided by the website configuration management application receives a selection of one of the timeline entries. Based on the selected timeline entry, the page display area of the user interface is updated. For example, a page configuration and metrics are determined, one or both of which correspond to the selected timeline entry. The page configuration indicates one or more page regions that are configured to measure or otherwise provide data about interactions with the page region. The metrics represent the interaction data for the configured page regions. In addition, the page display area is modified to present the page configuration with a graphical annotation element indicating the metrics. In some cases, some or all of the graphical annotation element is overlaid on the page configuration. Additionally or alternatively, the timeline is displayed concurrently with the page display area.

For a user of a configuration management application, concurrently displaying the timeline, a selected page configuration, and related metrics overlaid on the selected configuration allows the user focus on his or her development task, without expending computing resources on multiple conventional applications, and without risking disrupted concentration caused by switching between the conventional applications or between multiple conventional views in a conventional application. For example, the page display area is updated responsive to a selection of the displayed timeline entries, allowing a user to quickly review page configurations and interaction metrics for additional selected timeline entries. In addition, displaying the metrics overlaid on the selected configurations allows the user to efficiently determine the relative effectiveness of various configurations, such as by comparing metrics for multiple regions of a page.

Certain embodiments described herein address the Internet-centric problem of presenting various targeted website configurations to various visitors of a multi-target website, using the computer-implemented approach of developing the various configurations via a configuration management application that is capable of displaying historical data from the configurations and related interactions. For example, the user interface of the computer-implemented configuration management application improves techniques for developing multiple configurations by concurrently presenting a selected configuration, related interactions data, and a timeline of other configurations of the multi-target website. A user interface capable of presenting the interactions data via a graphical annotation overlaid on the selected configuration enables efficient recognition and comparison of interactions data for multiple regions of a particular configuration. In addition, a user interface capable of presenting the timeline of historical configurations alongside (or otherwise concurrently with) the selected configuration and data enables quick selection and review of the multiple historical configurations. A user interface that concurrently displays the history, appearance, and interaction data of multiple configurations for a multi-target website improves a user's access to and understanding of the multi-target website.

As used herein, the term "multi-target website" refers to a website that includes multiple configurations, such that each configuration is presented to a particular target segment of the multi-target website. For example, a multi-target website is developed to include graphics, text, or other content targeted towards a particular audience segment for the multi-target website. In some cases, a multi-target website includes multiple website configurations, such as various website configurations that include multiple interrelated pages developed to interact in various ways (e.g., linked pages, embedded pages, multi-page layouts). Additionally or alternatively, the multi-target website includes multiple webpage configurations, such as various page configurations that include various content items (e.g., graphics, text, videos). In some cases, a visitor to the multi-target website receives a particular configuration that is developed for a target segment in which the visitor is included. Additionally or alternatively, an additional visitor to the multi-target website receives an additional configuration that is developed for an additional target segment in which the additional visitor is included.

As used herein, the terms "segment" and "target segment" refer to a group of visitors to a multi-target website, who share one or more characteristics. For example, visitors in a particular segment share one or more personal characteristics, such as age, family status, hobbies, or any other suitable personal characteristic. Additionally or alternatively, visitors in the particular segment share one or more technical characteristics, such as an operating system, computing device, range of IP addresses, or any other suitable technical characteristic. In addition, visitors and the particular segment share one or more behavioral characteristics, such as a browsing history, a time of day (e.g., during which the target website is accessed), or any other suitable behavioral characteristic. In some cases, a visitor to the multi-target website receives a particular configuration of the multi-target website based on a particular target segment in which the visitor is included. For example, the visitor receives a particular configuration that is developed to be interesting and beneficial for website visitors included in the particular target segment.

As used herein, the term "configuration" refers to a website or webpage that is available for interactions by a particular visitor to a multi-target website. For example, a configuration includes (without limitation) a layout, text, graphics, links, metadata, a relation between two or more webpages, or any other property that is received by a website visitor. Additionally or alternatively, a configuration includes one or more measurement tools (e.g., cookies, web beacons, trackable links) that are capable of receiving and measuring interactions with the multi-target website. In some cases, a configuration includes a website configuration, such as a collection of webpages included in a particular website that is presented to a website visitor. For example, the collection of webpages have a particular configured interrelation between the pages (e.g., links, embedded pages, the multi-page layouts). Additionally or alternatively, a configuration includes a page configuration, such as a webpage that is presented to a website visitor.

In some cases, a configuration includes one or more configured page regions, such as a particular region (e.g., a link, a graphical image) of a webpage that is capable of receiving and measuring visitor interactions with the particular region. For example, a configured page region includes one or more measurement tools (e.g., cookies, web beacons, trackable links) that are capable of measuring visitor interactions with the region. Measured interactions include, without limitation, views, click-throughs, redistribution of content (e.g., shares), conversions (e.g., purchasing a product, signing up for a service), authentications (e.g., signing in via a login/password combination), or any other suitable interactions.

Figure 1:
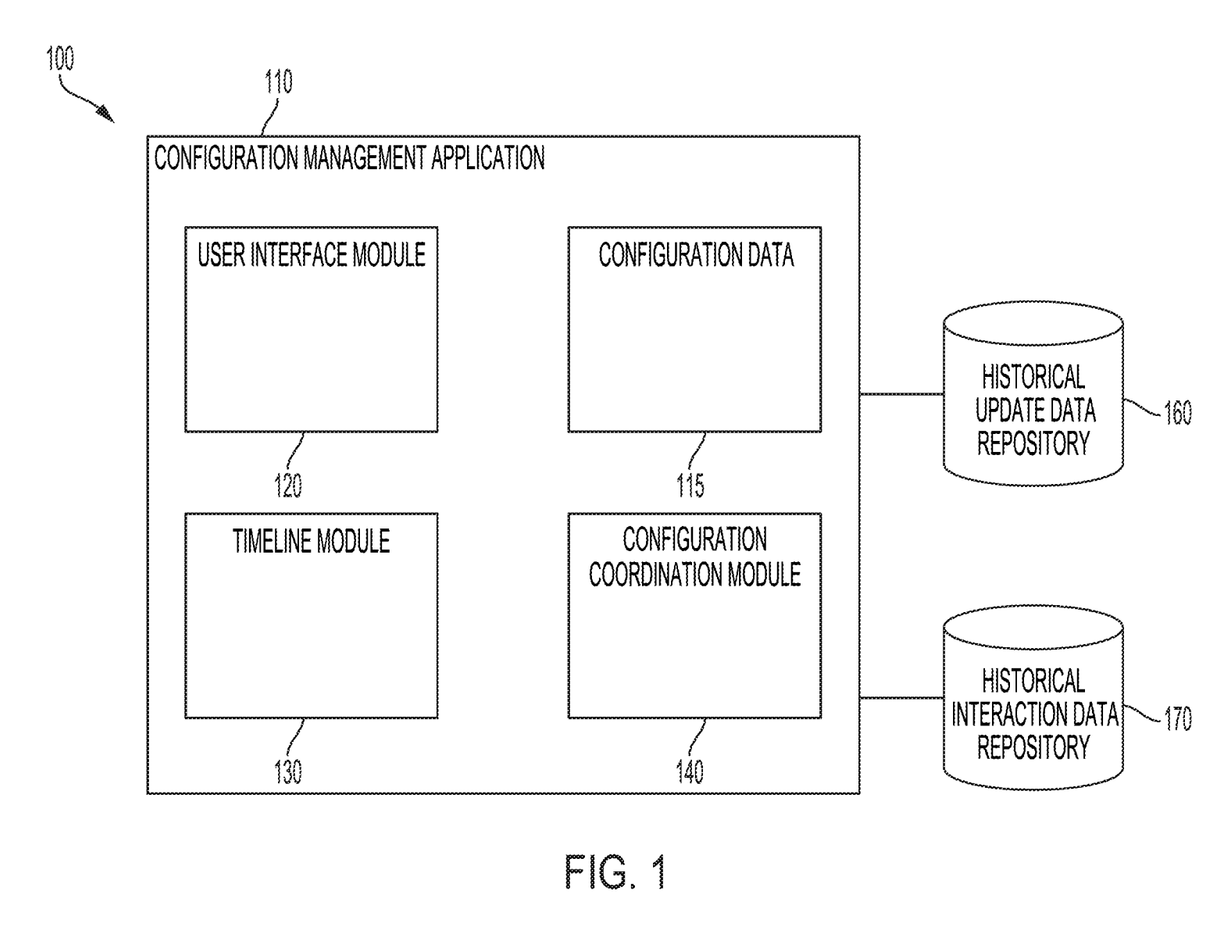
FIG. 1 depicts an example of a website development environment including a configuration management application, according to certain embodiments.

Referring now to the drawings, FIG. 1 depicts an example of a web site development environment 100. The website development environment 100 includes a configuration management application 110, and one or more data repositories, such as a historical update data repository 160 or a historical interaction data repository 170. In some cases, the configuration management application 110 includes one or more of a user interface module 120, a timeline module 130, or a configuration coordination module 140.

In some embodiments, the configuration management application 110 accesses configuration data 115 for one or more multi-target websites. For example, a user of the website development environment 100, such as a website developer, provides an indication of a particular multi-target website. Based on the indication from the user, the configuration management application 110 accesses configuration data 115 for the particular multi-target website. In some cases, the configuration data 115 is received from (or otherwise based on) data received from one or more of the data repositories 160 or 170. For example, the configuration data 115 includes historical page configurations received from the historical update data repository 160, indicating one or more webpages of the multi-target website. Additionally or alternatively, the configuration data 115 includes historical interaction data received from the historical interaction data repository 170, indicating visitor interactions with the multi-target website. In some cases, one or more of the configuration data 115 or the multi-target website are associated with a user account. In such cases, the configuration management application 110 accesses the configuration data 115 based on received authentication information, such as authentication information associated with the user account for the multi-target website. Additionally or alternatively, the configuration management application 110 provides or modifies a user interface responsive to receiving the authentication information associated with the user account.

In some cases, the historical page configurations correspond to respective periods of time. In the configuration management application 110, the timeline module 130 determines a timeline of historical page configurations for the multi-target website, based on the configuration data 115. For example, the configuration data 115 includes (or otherwise indicates) one or more updates made to one or more webpages of the multi-target website. Each update indicates, for example, a timestamp (e.g., a date, a time) indicating when the update was applied to the webpage. In some cases, the timeline module 130 generates a timeline for the multi-target website, or for a particular page of the multi-target website. Additionally or alternatively, the timeline includes a respective timeline entry for each of the updates. For example, the timeline module 130 generates a timeline for a homepage of the multi-target website, where the timeline includes multiple timeline entries indicating when the homepage was updated. In some cases, the timeline module 130 generates a timeline for a particular region of a page of the multi-target website. For example, the timeline module 130 generates a timeline for a banner region of the homepage, where the timeline includes timeline entries indicating when the banner region was updated and omits timeline entries associated with other updates to the homepage.

In some cases, the historical page configurations correspond to respective portions of historical interaction data. In the configuration management application 110, the configuration coordination module 140 determines one or more metrics from of the historical interaction data that correspond to respective historical page configurations, based on the configuration data 115. For example, the configuration data 115 includes (or otherwise indicates) multiple timestamps for updates to a particular page of the multi-target website. In some cases, the configuration coordination module 140 determines a period of time associated with each configuration of the particular page based on the timestamps. The period of time for each configuration is based, for example, on the timestamp for the configuration and a subsequent timestamp for a subsequent configuration. Additionally or alternatively, the configuration coordination module determines, from the historical interaction data, one or more metrics associated with each configuration of the particular page, based on the periods of time. The respective metrics for each configuration are based, for example, on the period of time associated with the configuration.

In some embodiments, historical page configurations or historical interaction data correspond to one or more targeted audience segments for the multi-target website. In the configuration management application 110, the historical update data repository 160 includes data indicating a target segment for a configuration of the multi-target website. Additionally or alternatively, the configuration coordination module 140 determines one or more configurations that are associated with respective target segments, based on the configuration data 115. For example, the configuration data 115 includes (or otherwise indicates) multiple target segments for the multi-target website, and one or more configurations of the multi-target website that are associated with each of the target segments. In some cases, the configuration coordination module 140 determines configurations associated with each target segment. Additionally or alternatively, the timeline module 130 generates a timeline for one or more of the configurations based on the associated target segment. For example, the timeline module generates a timeline for the homepage of the multi-target web site, where the timeline includes timeline entries for homepage configurations associated with a particular target segment and omits timeline entries for homepage configurations associated with additional target segments.

In the configuration management application 110, the user interface module 120 provides a user interface, via which the user views or interacts with the configuration data 115. For example, the user interface module 120 generates the user interface based on information received from the timeline module 130, such as information indicating one or more timeline entries for page configurations of the multi-target website. Additionally or alternatively, the user interface module 120 generates the user interface based on information received from the configuration coordination module 140, such as information indicating historical interaction data associated with the page configurations. In some cases, the user interface module 120 generates the user interface with one or more areas configured for display, such as a page display area, timeline area, or a segment area. Additionally or alternatively, the user interface module 120 generates the user interface with one or more interactive controls, such as a control configured to select a timeline entry or a control configured to select a segment.

In some implementations, the configuration management application 110 is capable of providing a development area as well as the page display area, timeline area, or segment area. For example, a user that is creating a new multi-target website accesses the development area to interact with various development tools for website creation. In addition, the user accesses one or more of the page display, timeline, or segment areas to review additional multi-target web sites, such as to determine successful (or unsuccessful) designs. In some cases, the development area includes development tools that are capable of accessing portions of the additional multi-target websites, such as to copy a selected portion to the website under development for reuse or adaptation by the user.

Figure 2:
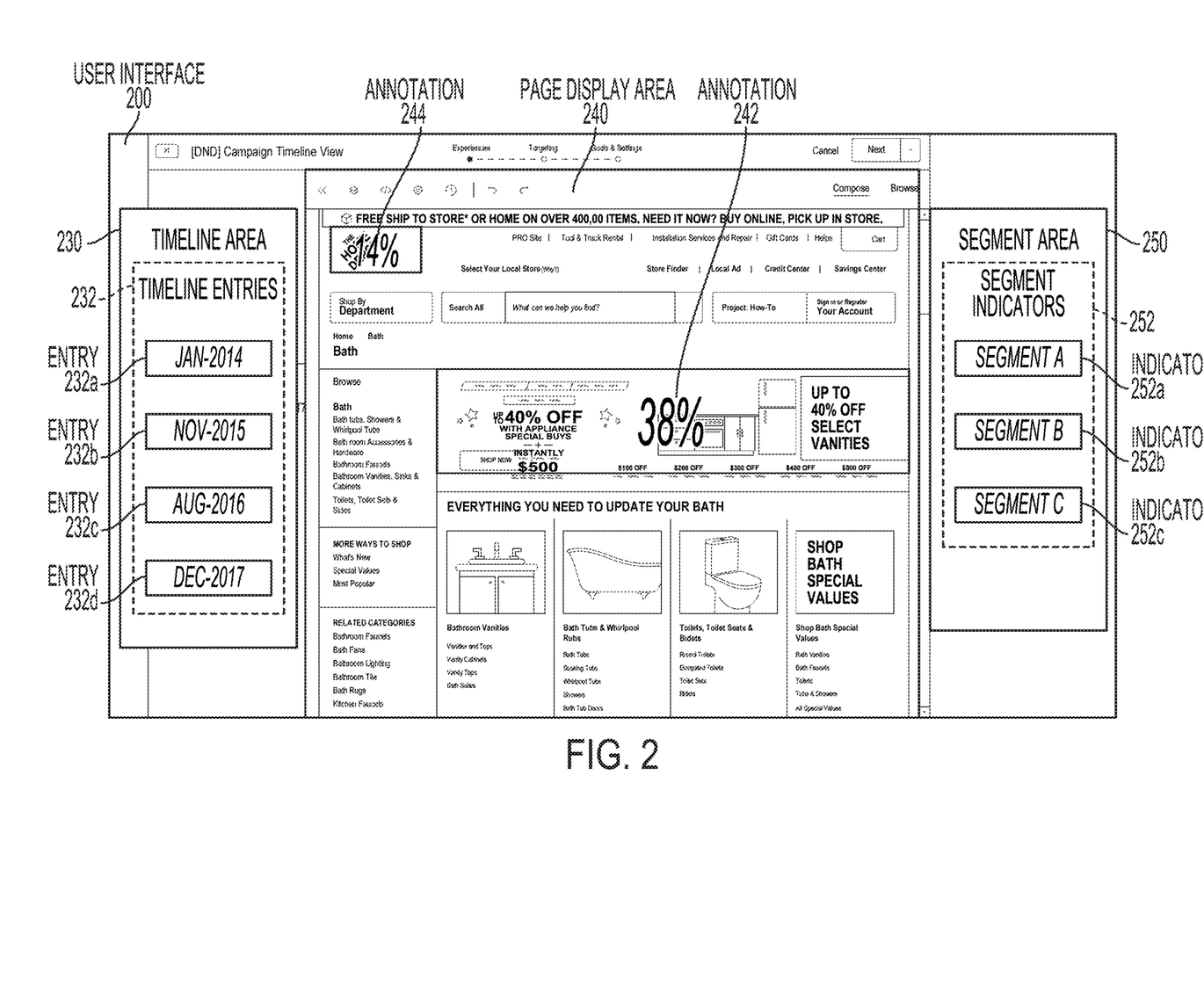
FIG. 2 depicts an example of a user interface for a configuration management application, according to certain embodiments.

FIG. 2 depicts an example of a user interface 200 for a configuration management application. The user interface 200 includes one or more of a page display area 240, a timeline area 230, or a segment area 250. In some cases, the user interface 200 is provided by a user interface module, such as the user interface module 120 included in the configuration management application 110. For example, the user interface module 120 generates the user interface 200 based on information received from one or more of the timeline module 130 or the configuration coordination module 140, as described in regards to FIG. 1. In some cases, the user interface 200 is configured for presentation via one or more display devices, such as a display screen, a touchscreen, or any other suitable display technique. Additionally or alternatively, the user interface 200 is configured to receive inputs via one or more input devices, such as a keyboard, mouse, microphone, touchscreen, or any other suitable input technique.

In some embodiments, the user interface 200 displays information about a multi-target website in one or more of the areas 230, 240, or 250. For example, the segment area 250 is configured to display information describing target segments of the multi-target website. The timeline area 230 is configured to display information related to updates of one or more configurations (e.g., page configurations, page region configurations) of the multi-target website. The page display area 240 is configured to display information related to a selected configuration of the multi-target website, such as a selected page configuration that is associated with a particular segment and a particular update of the multi-target website, or a graphical annotation indicating interaction data for the selected configuration.

In some cases, a configuration management application displays or modifies the user interface 200 based on a particular multi-target website. For example, the configuration management application receives data indicating the multi-target website, such as data received via an input to the user interface 200, or data received via a network connection to the configuration management application, or data received via any other suitable technique. Additionally or alternatively, the configuration management application displays or modifies the user interface 200 based on information associated with the multi-target website, such as information describing one or more of target segments for the multi-target website, configurations associated with the target segments, time data for the configurations, or interaction data for the configurations.

An area of the user interface 200 is configured to display, for example, information describing one or more target segments for the multi-target website. In the user interface 200, the segment area 250 is configured to display one or more segment indicators, such as an indicator 252a, an indicator 252b, or an indicator 252c. Each of the segment indicators 252 is associated with a respective target segment of the multi-target website. For example (and not by way of limitation), the indicator 252a is associated with a first target segment (e.g., singles aged 28-34 years) and includes the text "Segment A" describing the first target segment. Additionally or alternatively, the indicator 252b is associated with a second target segment (e.g., family members aged 45-52) and includes the text "Segment B" describing the second target segment. Also, indicator 252c is associated with a third target segment (e.g., couples aged 68-72) and includes the text "Segment C" describing the third target segment. In some cases, each of the segment indicators 252 is configured to receive a selection of the associated target segment, such as via an input to the user interface 200. Additionally or alternatively, the user interface 200 is modified based on the selected target segment. For example, in response to receiving a selection via the indicator 252a, the user interface 200 is modified to present information related to the first target segment.

An additional area of the user interface 200 is configured to display, for example, time information describing configurations of the multi-target website. In the user interface 200, the timeline area 230 is configured to display one or more timeline entries 232, such as entry 232a, entry 232b, entry 232c, or entry 232d. Each of the timeline entries 232 is associated with a configuration of the multi-target website. In some cases, each of the timeline entries 232 is configured to receive a selection of the associated configuration, such as via an input to the user interface 200. Additionally or alternatively, the timeline entries 232 indicate dates or times at which the multi-page website has been updated, such as an update from one configuration to another. For example (and not by way of limitation), the entry 232a is associated with a first configuration that was made available (such as via a release following an update) in January 2014, and includes the text "Jan-2014" describing the first configuration. Additionally or alternatively, the entries 232b, 232c, and 232d are respectively associated with second, third, and fourth configurations made available in November 2015, August 2016, and December 2017, respectively. The entries 232b, 232c, and 232d include the respective text "Nov-2015," "Aug-2016," and "Dec-2017," describing the second, third, and fourth configurations. In some cases, a particular configuration is associated with a period of time during which the particular configuration is made available. For example, if the first configuration was made available in January 2014 and remained available until November 2015 (e.g., when the second configuration was made available), the first configuration is associated with the period of time between January 2014 and November 2015. Additionally or alternatively, the second configuration is associated with the period of time between November 2015 and August 2016, and the third configuration is associated with the period of time between August 2016 and December 2017. In some cases, a configuration is associated with a period of time including the current time. For example, in the user interface 200, the fourth configuration is associated with a period of time between December 2017 and a current date.

In some cases, the timeline area 230 is modified based on an input received via the segment area 250. For example, the timeline area 230 displays entries, such as the timeline entries 232, that are associated with first target segment indicated by the indicator 252a. If the user interface 200 receives an input via the indicator 252b, for example, the timeline area 230 is modified to display timeline entries associated with the second target segment. The modified timeline entries for the second target segment need not be similar to the timeline entries 232 for the first target segment. For example (and not by way of limitation), if the second target segment has historical configurations made available in January 2014, March 2016, and July 2017, the modified timeline entries indicate the dates or times at which the configurations for the second target segment were made available.

Another area of the user interface 200 is configured to display, for example, graphical information describing configurations or interaction data, or both, of the multi-target website. In the user interface 200, the page display area 240 is configured to display a graphical representation of a selected configuration, such as the configuration selected via an input to one of the timeline entries 232. The graphical representation includes, for example, one or more regions of the configuration, such as a page configuration having a banner region, a sidebar region, or a header region. The configuration, or a particular region of the configuration, is associated with one or more metrics representing interaction data for the multi-target website. For example, if the selected configuration had been available for a period of time (e.g., from January 2014 to November 2015 for the first configuration) the associated metric represents visitor interactions with the configuration during the period of time. In some cases, a particular region of the configuration is associated with a particular metric of the interaction data. For example, a banner region of the page configuration is associated with metrics (e.g., a conversion rate, a view count) for visitors that interacted with (e.g., clicked on, viewed) the banner region.

Additionally or alternatively, the page display area 240 is configured to display one or more graphical annotations, such as an annotation 242 or an annotation 244. The graphical annotations are associated with the selected configuration, or a region of the configuration. For example, the annotation 242 is associated with a banner region, and the annotation 244 is associated with a header region. Additionally or alternatively, the graphical annotations indicate metrics of interaction data that are associated with the respective configuration or region, during the period of time for the selected configuration (e.g., from January 2014 to November 2015 for the first configuration). For example (and not by way of limitation), the annotation 242 indicates interactions with the banner region, such as text "38%" indicating a conversion rate of 38%. The annotation 244 indicates interactions with the header region, such as text "14%" indicating a conversion rate of 14%. In some cases, the page display area 240 is configured to display the graphical annotations concurrently with the displayed configuration. For example, FIG. 2 depicts the annotations 242 and 244 overlaid on the selected configuration, but other concurrent display techniques are possible.

In some cases, the page display area 240 is modified based on an input received via the timeline area 230. For example, the page display area 240 displays the first configuration that is associated with the timeline entry 232a. If the user interface 200 receives an input via the entry 232b, for example, the page display area 240 is modified to display the second configuration that is associated with the timeline entry 232b. Additionally or alternatively, the page display area 240 is modified to display one or more additional graphical annotations associated with the second configuration. The modified graphical annotations for the second configuration need not be similar to the annotations 242 and 244 for the first configuration. For example (and not by way of limitation), if the second configuration is associated with the period of time between November 2015 and August 2016, the modified annotations indicate interaction data with the second configuration between November 2015 and August 2016.

In some implementations, the user interface 200 includes one or more additional page display areas or timeline areas. For example, the user interface 200 is configured to present or update an additional page display area to present graphical information describing an additional webpage configuration, or additional graphical annotation for metrics of the additional configuration. The additional page display area is presented, for example, in a same view of the user interface 200 as the page display area 240. Additionally or alternatively, the user interface 200 is configured to display additional timeline entries related to the additional webpage configuration. For example, the additional entries could be displayed via the timeline area 230, or could be displayed via an additional timeline area in the user interface 200. In some cases, the multiple page display areas are updated to present information related to multiple target segments, or to multiple timeline entries. For example, responsive to receiving an additional selection of an additional timeline entry, or of an indicator for an additional target segment, the user interface is modified to present information related to the first selection in the page display area 240, and information related to the additional selection in the additional page display area. Presenting multiple page display areas, or multiple timeline areas, allows a user to compare multiple configurations associated with various target segments or timeline entries.

In some cases, configuring a user interface to display a timeline of historical website configurations concurrently with interaction data for each configuration allows a user to quickly review multiple configurations and related interaction data. For example, a user interacting with the user interface 200 is able to quickly determine a relative success of configurations for the multi-target website, by selecting each of the timeline entries 232 and reviewing the associated configurations and annotations of the interaction data. A user interface that presents the historical configurations, such as via a timeline, alongside the interaction data correlated with each region of the configurations, such as via overlaid annotations, also allows the user to quickly determine a particular region that received relatively high or relatively low visitor interactions. The user may use the presented information to more quickly and accurately develop an additional configuration, or an additional multi-target website with multiple additional configurations.

FIG. 2 depicts the user interface 200 as displaying each of the page display area 240, the timeline area 230, and the segment area 250 together, but other implementations are possible. For example, a configuration management application is configured to display one or more of a segment area, timeline area, or page display area on a separate view of a user interface. In one such example, the configuration management application displays the segment area on a first view or user interface element (e.g., a menu, a sidebar), and responsive to receiving a selection input via the segment area, modifies the user interface to display the timeline and page display areas on a second view or user interface element.

Figure 3:
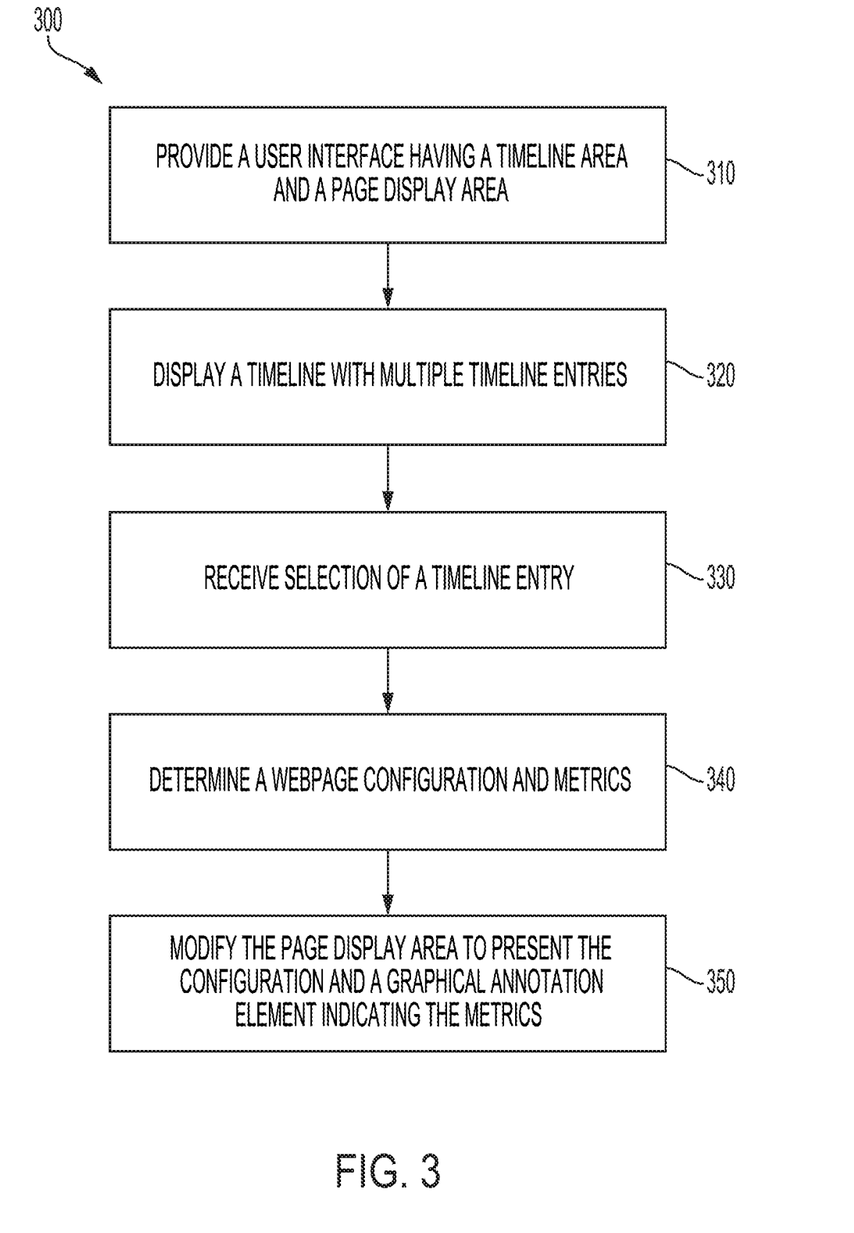
FIG. 3 depicts an example of a process for displaying interaction data associated with a timeline of webpage configurations, according to certain embodiments.

FIG. 3 depicts an example of a process 300 for displaying interaction data associated with a timeline of webpage configurations. In some embodiments, such as described in regards to FIGS. 1 and 2, a computing device executing a configuration management application implements operations described in FIG. 3, by executing suitable program code. For illustrative purposes, the process 300 is described with reference to the examples depicted in FIGS. 1 and 2. Other implementations, however, are possible.

At block 310, the process 300 involves providing a user interface, such as a user interface for a configuration management application. The user interface, for example, allows a user to review (or otherwise interact with) configuration data for a multi-target website that is accessible via the configuration management application. In some cases, the user interface includes a timeline area and a page display area. For example, the user interface 200 is configured to display the timeline area 230 and the page display area 240. In some cases, the user interface is configured to display the timeline area adjacent to the page display area. Additionally or alternatively, the user interface is configured to display the timeline area and page display area concurrently (e.g., displayed on a same view that is visible to the user). In some implementations, concurrently displaying the adjacent timeline and page display areas allows a user of the user interface to quickly navigate between timeline entries, and to efficiently review and analyze the page configurations for the timeline entries. A non-limiting example of an adjacent timeline area and page display area is depicted in FIG. 2, such as the depicted relation between the timeline area 230 and the page display area 240.

At block 320, the process 300 involves displaying a timeline with multiple timeline entries, such as via the timeline area of the user interface. In some cases, each particular timeline entry of the displayed timeline is correlated with a respective period of time. Additionally or alternatively, each particular timeline entry corresponds to a respective webpage configuration of the multi-target website, to a respective metric from interaction data for the multi-target website, or both. For example, each of the timeline entries 232 corresponds to a respective page configuration and interaction metric for a multi-target website that is reviewed via the user interface 200.

At block 330, the process 300 involves receiving a selection of a particular timeline entry included in the displayed timeline. In some cases, the selection of the particular timeline entry is received via the user interface. For example, the selection is received via an input to the timeline area 230, the input indicating one of the timeline entries 232.

At block 340, the process 300 involves determining one or more of a webpage configuration or one or more metrics. The webpage configuration or the metrics (or both) correspond, for example, to the selected timeline entry. In some cases, the webpage configuration indicates one or more configured page regions, such as a particular region of a webpage that is configured to receive or measure visitor interactions with the particular region. Additionally or alternatively, the webpage configuration, the configured page region, or both correspond to a target segment of the configuration. For example, the configured page region corresponds to a target segment of the multi-target website that includes the webpage configuration. In some cases, the configured page region is available during the period of time correlated with the selected timeline entry. For example, the configured page region is available for visitor interactions with the multi-target website (e.g., a "live" website, a released page version) during the period of time.

In some embodiments, the metrics corresponding to the selected timeline entry represent interaction data with the configured page region during the period of time. For example, if the configured page region is available for a 24-hour period of time, the configured page region receives and measures visitor interactions during the 24-hour period of time. Additionally or alternatively, the measured visitor interactions during the 24-hour period of time are stored as interaction data for the multi-target website. In some cases, one or more metrics representing the interactions during the 24-hour period of time are determined, such as by the configuration coordination module 140, and correlated with the timeline entry. By associating each of the timeline entries with respective metrics for the correlated periods of time, the configuration management application allows a user to quickly select entries from the displayed timeline and to accurately identify the interaction data metrics for each selected entry.

At block 350, the process 300 involves modifying the page display area to present the webpage configuration and a graphical annotation element indicating the one or more metrics. In some cases, the page display area is configured to present the graphical annotation element overlaid on the configured page region. Additionally or alternatively, the graphical annotation element indicates the metrics for the overlaid configured page region. For example, the page display area 240 is modified to present the graphical annotations 242 and 244, indicating metrics for a selected one of the timeline entries 232. Each of the graphical annotations 242 and 244 indicate respective interaction metrics for the banner region and header region, on which the annotations are overlaid. In some implementations, overlaying a configured page region with a graphical annotation indicating metrics for the overlaid page region enables a user to efficiently determine the effectiveness (e.g., a relatively high interaction metric) of a configured page region. In some cases, the user's efficiency is especially improved for webpage configurations that include multiple configured page regions. For example, the user interface 200 allows a user to rapidly identify, via the annotations 242 and 244, the interaction metrics for the banner region and the header region in the page configuration displayed in the page display area 240.

In some cases, a user interface with a timeline area and a page display area enables a user to make improved decisions regarding a multi-target website. For example, a website developer can perform development or targeting decisions based on interaction data over time, for various configurations of a web page. A configuration management application that is configured to present interaction data overlaid on a page display area, for a selected segment and timeline entry, may improve the efficiency and accuracy of the website developer's decisions.

Figure 4:
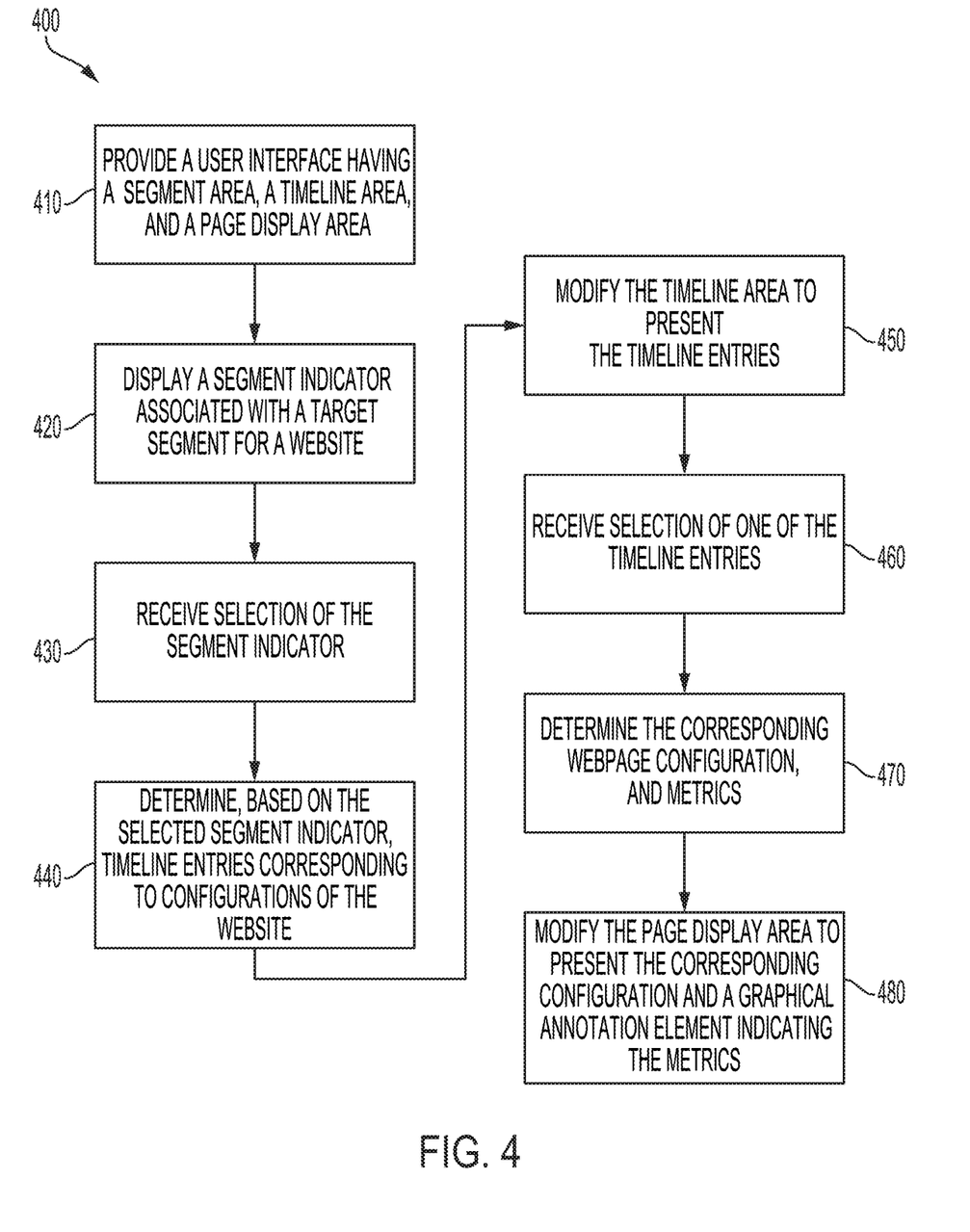
FIG. 4 depicts an example of a process for displaying interaction data with a timeline of webpage configurations for multiple target segments of a multi-target website, according to certain embodiments.

FIG. 4 depicts an example of a process 400 for displaying interaction data with a timeline of webpage configurations for multiple target segments of a multi-target website. In some embodiments, such as described in regards to FIGS. 1-3, a computing device executing a configuration management application implements operations described by FIG. 4, by executing suitable program code. For illustrative purposes, the process 400 is described with reference to the examples addicted in FIGS. 1-3. Other implementations, however, are possible.

At block 410, the process 400 involves providing a user interface, such as a user interface for a configuration management application. The user interface, for example, allows a user to review (or otherwise interact with) configuration data for a multi-target website that is accessible via the configuration management application. In some cases, the user interface includes a segment area, a timeline area, and a page display area. For example, the user interface 200 is configured to display the timeline area 230, the page display area 240, and the segment area 250. Additionally or alternatively, a user interface displays the segment area in a separate view (e.g., a menu, a page of the user interface) from the timeline area or the page display area.

At block 420, the process 400 involves displaying one or more segment indicators associated with respective target segments for the multi-target website, such as via the segment area of the user interface. In some cases, the multi-target website includes one or more configurations respectively associated with each of the target segments, such as a targeted configuration that is presented to a website visitor who is included in one of the target segments. For example, each of the segment indicators 252 corresponds to one or more configurations associated with a respective target segment for a multi-target website that is reviewed via the user interface 200.

At block 430, the process 400 involves receiving a selection of a particular segment indicator included in the segment area. In some cases, the selection of the particular segment indicator is received via the user interface. For example, the selection is received via an input to the segment area 250, the input indicating one of the segment indicators 252. In some cases, the selected segment indicator corresponds to a target segment of the multi-target website. Additionally or alternatively, the selected segment indicator corresponds to one or more configurations of the multi-target website, such as configurations that are associated with the corresponding target segment.

At block 440, the process 400 involves determining, based on the selected segment indicator, one or more timeline entries corresponding to one or more configurations of the multi-target website. For example, one or more webpage configurations associated with the corresponding target segment are determined based on the selected segment indicator. Additionally or alternatively, a respective timeline entry for each of the webpage configurations is determined. For example, the timeline module 130 determines a timeline entry, such as for each page configuration associated with a corresponding target segment, based on a selected segment indicator. In some cases, each of the timeline entries is determined based on a respective timestamp of each configuration, such as a timestamp indicating a update of the configuration or a release (e.g., to a live web site) of the configuration. Additionally or alternatively, each of the timeline entries is correlated with a respective period of time. In some cases, the period of time for a particular timeline entry is determined based on one or more timestamps for one or more of the configurations, such as a difference between the update timestamp of the configuration and a subsequent update timestamp of a subsequent configuration.

At block 450, the process 400 involves modifying or displaying the timeline area to present the one or more determined timeline entries. For example, the timeline area is modified to present a timeline including the timeline entries. In some cases, the timeline area is configured to present the timeline entries in a sequence. The sequence is determined, for example, based on the timestamp associated with each entry, or the period of the time associated with each entry, or both. Additionally or alternatively, the timeline area is modified to present timeline entries associated with the target segment for the selected segment indicator, and to omit timeline entries associated with additional target segments.

At block 460, the process 400 involves receiving a selection of a particular timeline entry of the displayed entries. In some cases, the selection of the particular timeline entry is received by the user interface. For example, the selection is received via an input to the timeline area 230, the input indicating one of the timeline entries 232.

At block 470, the process 400 involves determining the webpage configuration and one or more metrics corresponding to the selected timeline entry. In some cases, the metrics represent interaction data with one or more configured page regions of the webpage configuration. For example, the corresponding metrics represent interactions performed by website visitors included in the target segment for the selected segment indicator.

At block 480, the process 400 involves modifying the page display area to present the corresponding website configuration and a graphical annotation element indicating the one or more corresponding metrics. In some cases, the page display area is configured to present one or more graphical annotation elements overlaid on the one or more configured page regions. Additionally or alternatively, the graphical annotation elements respectively indicate the metrics for the overlaid configured page regions. For example, the page display area 240 is modified to present the graphical annotations 242 and 244, indicating metrics for a selected one of the timeline entries 232. Each of the graphical annotations 242 and 244 indicate respective interaction metrics for the banner region and header region, on which the annotations are overlaid.

Figure 5:
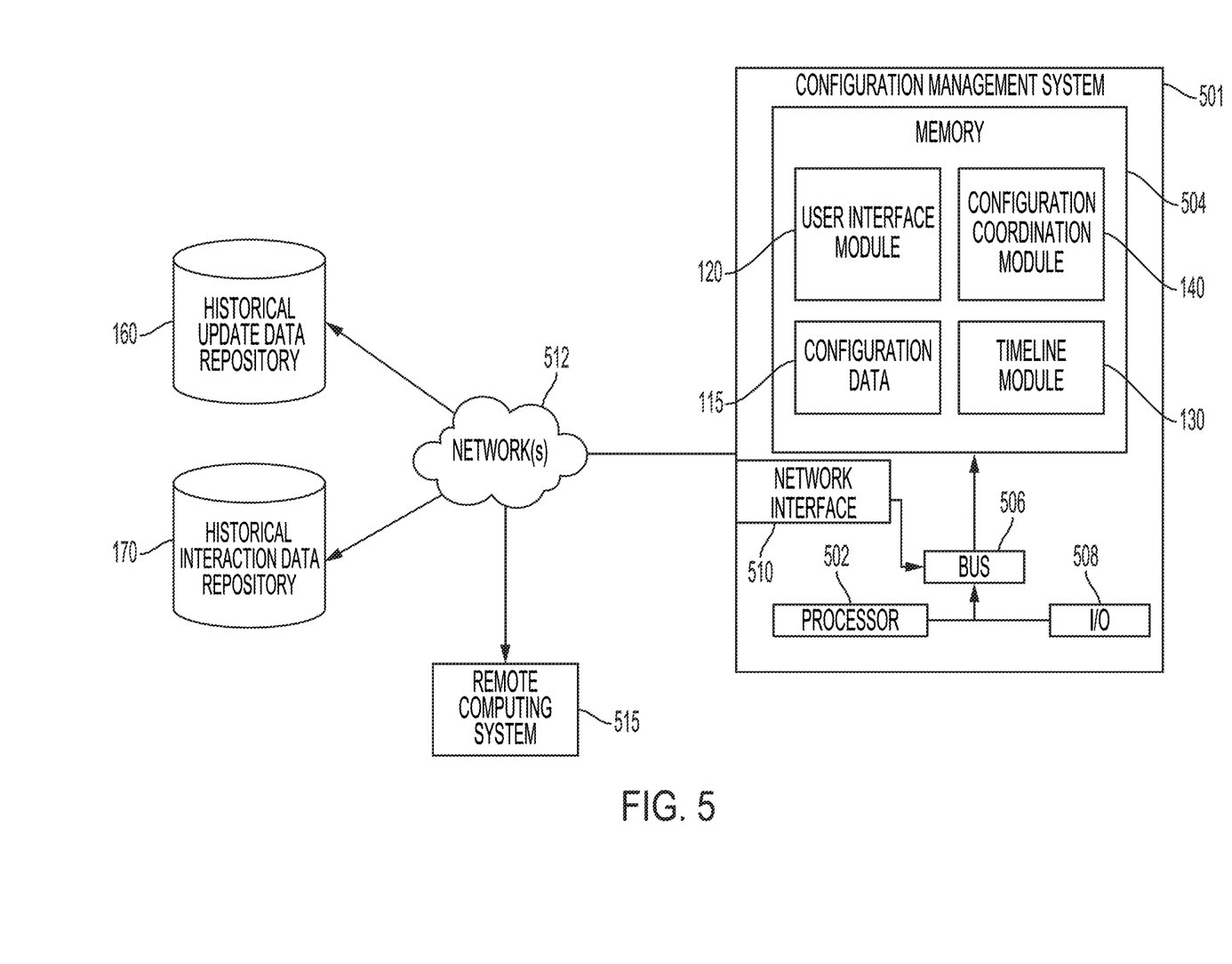
FIG. 5 depicts an example of a computing system for implementing a configuration management application, according to certain embodiments.

Any suitable computing system or group of computing systems can be used for performing the operations described herein. For example, FIG. 5 depicts a block diagram of computing system capable of providing a configuration management application, according to certain embodiments.

The depicted example of a configuration management system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the user interface module 120, the configuration data 115, the configuration coordination module 140, the timeline module 130, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The configuration management system 501 may also include a number of external or internal devices such as input or output devices. For example, the configuration management system 501 is shown with an input/output ("I/O") interface 508 that can receive input from input devices or provide output to output devices. For example, the user interface 200 provides or receives information (e.g., display information, selection inputs) via the I/O interface 508. A bus 506 can also be included in the configuration management system 501. The bus 506 can communicatively couple one or more components of the configuration management system 501.

The configuration management system 501 executes program code that configures the processor 502 to perform one or more of the operations described above with respect to FIGS. 1-4. The program code includes operations related to, for example, one or more of the user interface module 120, the configuration data 115, the configuration coordination module 140, the timeline module 130, or other suitable applications or memory structures that perform one or more operations described herein. The program code may be resident in the memory device 504 or any suitable computer-readable medium and may be executed by the processor 502 or any other suitable processor. In some embodiments, the program code described above, the user interface module 120, the configuration data 115, the configuration coordination module 140, and the timeline module 130 are stored in the memory device 504, as depicted in FIG. 5. In additional or alternative embodiments, one or more of user interface module 120, the configuration data 115, the configuration coordination module 140, the timeline module 130, and the program code described above are stored in one or more memory devices accessible via a data network, such as a memory device accessible via a cloud service.

The configuration management system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. A remote computing system 515 is connected to the configuration management system 501 via network 512, and the remote system 515 can perform some of the operations described herein, such as receiving inputs or displaying the user interface 200. The configuration management system 501 is able to communicate with one or more of the remote computing system 515, the historical update data repository 160, or the historical interaction data repository 170 using the network interface 510. Although FIG. 5 depicts the data repositories 160 and 170 as connected to configuration management system 501 via the networks 512, other embodiments are possible, including the data repositories 160 and 170 being located in the memory 504 of configuration management system 501.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for displaying interaction data concurrently with a page configuration timeline, the method including operations performed by one or more processing devices, wherein the operations comprise:
   providing a user interface ("UI") comprising a timeline area, a segment area, and a page display area;
   displaying, via the timeline area, a first timeline comprising a first set of timeline entries associated with a first target segment indicated in the segment area, wherein each timeline entry of the first set of timeline entries is correlated with a respective period of time;
   presenting a first webpage configuration and a first graphical annotation element indicating first metrics corresponding to a first timeline entry of the first set of timeline entries, wherein the first webpage configuration indicates a first configured page region that (i) corresponds to the first target segment and (ii) is available to the first target segment during a first period of time corresponding to the first timeline entry of the first set of timeline entries, wherein the first metrics represent first interaction data indicating interactions with the first configured page region by visitors in the first target segment during the first period of time;
   receiving, via the segment area, a selection of a second target segment;
   responsive to receiving the selection of the second target segment, updating the timeline area to present a second timeline comprising a second set of timeline entries associated with the second target segment indicated in the segment area, wherein each timeline entry of the second set of timeline entries is correlated with a respective period of time;
   receiving, via the updated timeline area, a selection of a timeline entry of the second set of timeline entries; and
   updating the page display area based on the selection by performing update operations comprising:
      determining a second webpage configuration and second metrics corresponding to the selected timeline entry of the second set of timeline entries,
      wherein the second webpage configuration indicates a second configured page region that (i) corresponds to the second target segment and (ii) is available to the second target segment during a second period of time corresponding to the selected timeline entry of the second set of timeline entries,
      wherein the second metrics represent second interaction data for the second configured page region, the second interaction data indicating interactions with the second configured page region by visitors in the second target segment during the second period of time, and
      modifying the page display area to present the second webpage configuration and a second graphical annotation element indicating the second metrics, wherein at least a portion of the second graphical annotation element is overlaid on the second configured page region.

2. The method of claim 1, wherein the selected timeline entry of the second set of timeline entries is associated with an update timestamp of the second webpage configuration, and wherein the second metrics are determined based on the update timestamp of the second webpage configuration.

3. The method of claim 1, wherein the UI further comprises an additional page display area, and the operations further comprise:
   receiving, via the UI, an additional selection of an additional timeline entry; and
   updating the additional page display area based on the additional selection by performing update operations comprising:
      determining an additional webpage configuration and additional metrics corresponding to the additional timeline entry, and
      modifying the additional page display area to present the additional webpage configuration and an additional graphical annotation element indicating the additional metrics.

4. The method of claim 1, wherein each timeline entry of the first set of timeline entries displays time information corresponding to a respective webpage configuration, and the UI is configured to display the timeline area concurrently with the page display area.

5. The method of claim 1, further comprising:
   receiving, via the UI, an additional selection of an additional target segment; and
   updating the timeline area based on the additional selection by performing update operations comprising:
      determining one or more additional webpage configurations associated with the additional target segment,
      for each additional webpage configuration, determining an update timestamp,
      generating an additional timeline comprising an additional set of timeline entries, wherein each timeline entry of the additional set of timeline entries is based on a respective one of the update timestamps, and
      modifying the timeline area to present the additional timeline.

6. The method of claim 1, further comprising:
   receiving, via the UI, an additional selection of an additional timeline entry; and
   updating the page display area based on the additional selection by performing update operations comprising:
      determining an additional webpage configuration and additional metrics corresponding to the additional timeline entry, and
      modifying the page display area to present the additional webpage configuration and an additional graphical annotation element indicating the additional metrics.

7. A non-transitory computer-readable medium embodying program code for displaying interaction data concurrently with a page configuration timeline, the program code comprising instructions which, when executed by a processor, cause the processor to perform operations comprising:
provides a user interface ("UI") comprising a timeline area, a segment area, and a page display area;
displaying, via the timeline area, a first timeline comprising a first set of timeline entries associated with a first target segment indicated in the segment area, wherein each timeline entry of the first set of timeline entries is correlated with a respective period of time;
presenting a first webpage configuration and a first graphical annotation element indicating first metrics corresponding to a first timeline entry of the first set of timeline entries, wherein the first webpage configuration indicates a first configured page region that (i) corresponds to the first target segment and (ii) is available to the first target segment during a first period of time corresponding to the first timeline entry of the first set of timeline entries, wherein the first metrics represent first interaction data indicating interactions with the first configured page region by visitors in the first target segment during the first period of time;
receiving, via the segment area, a selection of a second target segment;
responsive to receiving the selection of the second target segment, updating the timeline area to present a second timeline comprising a second set of timeline entries associated with the second target segment indicated in the segment area, wherein each timeline entry of the second set of timeline entries is correlated with a respective period of time;
receiving, via the updated timeline area, a selection of a timeline entry of the second set of timeline entries; and
updating the page display area based on the selection by performing update operations comprising:
determining a second webpage configuration and second metrics corresponding to the selected timeline entry of the second set of timeline entries,
wherein the second webpage configuration indicates a second configured page region that (i) corresponds to the second target segment and (ii) is available to the second target segment during a second period of time corresponding to the selected timeline entry of the second set of timeline entries,
wherein the second metrics represent second interaction data for the second configured page region, the second interaction data indicating interactions with the second configured page region by visitors in the second target segment during the second period of time, and
modifying the page display area to present the second webpage configuration and a second graphical annotation element indicating the second metrics, wherein at least a portion of the second graphical annotation element is overlaid on the second configured page region.

8. The non-transitory computer-readable medium of claim 7, wherein the selected timeline entry of the second set of timeline entries is associated with an update timestamp of the second webpage configuration, and wherein the second metrics are determined based on the update timestamp of the second webpage configuration.

9. The non-transitory computer-readable medium of claim 7, wherein the UI further comprises an additional page display area, and the operations further comprise:
receiving, via the UI, an additional selection of an additional timeline entry; and
updating the additional page display area based on the additional selection by performing update operations comprising:
determining an additional webpage configuration and additional metrics corresponding to the additional timeline entry, and
modifying the additional page display area to present the additional webpage configuration and an additional graphical annotation element indicating the additional metrics.

10. The non-transitory computer-readable medium of claim 7, wherein each timeline entry of the first set of timeline entries displays time information corresponding to a respective webpage configuration, and
the UI is configured to display the timeline area concurrently with the page display area.

11. The non-transitory computer-readable medium of claim 7, the operations further comprising:
receiving, via the UI, an additional selection of an additional target segment; and
updating the timeline area based on the additional selection by performing update operations comprising:
determining one or more additional webpage configurations associated with the additional target segment,
for each additional webpage configuration, determining an update timestamp,
generating an additional timeline comprising an additional set of timeline entries, wherein each timeline entry of the additional set of timeline entries is based on a respective one of the update timestamps, and
modifying the timeline area to present the additional timeline.

12. The non-transitory computer-readable medium of claim 7, the operations further comprising:
receiving, via the UI, an additional selection of an additional timeline entry; and
updating the page display area based on the additional selection by performing update operations comprising:
determining an additional webpage configuration and additional metrics corresponding to the additional timeline entry, and
modifying the page display area to present the additional webpage configuration and an additional graphical annotation element indicating the additional metrics.

13. The non-transitory computer-readable medium of claim 7, the operations further comprising receiving authentication information associated with a user account, wherein:
the first and second webpage configurations and the first and second metrics are associated with the user account, and
the page display area is updated subsequent to receiving the authentication information.

14. A system for displaying interaction data concurrently with a timeline of webpage configurations for multiple target segments of a multi-target website, the system comprising:
a means for providing a user interface ("UI") comprising a segment area, a timeline area, and a page display area;
a means for displaying a first segment indicator associated with a first target segment of the multi-target website;
a means for receiving, via the UI, a selection of the first segment indicator via the segment area;
a means for determining a first timeline comprising a first set of timeline entries, wherein each timeline entry of the first set of timeline entries corresponds to a respective webpage configuration accessible by visitors included in the first target segment;

a means for presenting a first webpage configuration and a first graphical annotation element indicating first metrics corresponding to a first timeline entry of the first set of timeline entries, wherein the first webpage configuration indicates a first configured page region that (i) corresponds to the first target segment and (ii) is available to the first target segment during a first period of time corresponding to the first timeline entry of the first set of timeline entries, wherein the first metrics represent first interaction data indicating interactions with the first configured page region by visitors in the first target segment;

a means for receiving, via the segment area, a selection of a second segment indicator associated with a second target segment of the multi-target website;

a means for, responsive to receiving the selection of the second segment indicator, modifying the timeline area to present a second timeline comprising a second set of timeline entries corresponding to the second target segment, wherein each timeline entry of the second set of timeline entries is correlated with a respective period of time, a means for receiving, via the modified timeline area, a selection of a particular timeline entry of the second set of timeline entries; and a means for updating the page display area based on the selection of the particular timeline entry by performing update operations comprising:
  determining a second webpage configuration and second metrics corresponding to the selected timeline entry of the second set of timeline entries,
  wherein the second webpage configuration indicates a second configured page region that (i) corresponds to the second target segment and (ii) is available to the second target segment during a period of time correlated with the selected timeline entry of the second set of timeline entries,
  wherein the second metrics represent second interaction data for the second configured page region, the second interaction data indicating interactions with the second configured page region by visitors in the second target segment during the period of time, and
  modifying the page display area to present the second webpage configuration and a second graphical annotation element indicating the second metrics, wherein at least a portion of the second graphical annotation element is overlaid on the second configured page region.

15. The system of claim 14, wherein the UI further comprises an additional page display area, the system further comprising:
  a means for receiving, via the UI, an additional selection of an additional timeline entry; and
  a means for updating the additional page display area based on the additional selection by performing update operations comprising:
    determining an additional webpage configuration and additional metrics corresponding to the additional timeline entry, and
    modifying the additional page display area to present the additional webpage configuration and an additional graphical annotation element indicating the additional metrics.

16. The system of claim 15, wherein the additional timeline entry is received via an additional timeline area provided by the UI.

17. The system of claim 14, wherein each timeline entry of the first set of timeline entries displays time information corresponding to the respective webpage configurations, and the UI is configured to display the timeline area concurrently with the page display area.

18. The system of claim 14, further comprising:
  a means for receiving, via the UI, an additional selection of an additional segment indicator associated with an additional target segment; and
  a means for further modifying the timeline area based on the additional selection by performing update operations comprising:
    determining one or more additional webpage configurations associated with the additional target segment,
    for each additional webpage configuration, determining an update timestamp,
    determining an additional timeline comprising an additional set of timeline entries, wherein each timeline entry of the additional set of timeline entries is based on a respective one of the update timestamps, and
    modifying the timeline area to present the additional timeline.

19. The system of claim 14, further comprising:
  a means for receiving, via the UI, an additional selection of an additional timeline entry; and
  a means for updating the page display area based on the additional selection by performing update operations comprising:
    determining an additional webpage configuration and additional metrics corresponding to the additional timeline entry, and
    modifying the page display area to present the additional webpage configuration and an additional graphical annotation element indicating the additional metrics.

20. The system of claim 14, further comprising receiving authentication information associated with a user account, wherein:
  the first and second webpage configurations and the first and second metrics are associated with the user account, and
  the page display area is updated subsequent to receiving the authentication information.

\* \* \* \* \*